March 1, 1966  E. P. MacDONALD  3,237,710
SEAT BELT CONTROLLED WARNING SYSTEM
Filed April 17, 1963

INVENTOR.
Edwin P. MacDonald
BY
Roberts, Cushman & Grover,
ATT'YS.

United States Patent Office 3,237,710
Patented Mar. 1, 1966

3,237,710
SEAT BELT CONTROLLED WARNING SYSTEM
Edwin P. MacDonald, South Windham, Maine
Filed Apr. 17, 1963, Ser. No. 273,716
6 Claims. (Cl. 180—82)

The field of utility of this invention is that of passenger safety devices for motor vehicles, and more particularly of seat safety belt controlled warning system.

Statistics prove that carelessness or forgetfulness are usually the reason why drivers whose cars are equipped with safety belts, neglect to take the elementary precaution of securing their belts and induce passengers, if any, to do the same. If the matter is called to the attention of the driver he will most likely insist that his passengers, if any, also fasten their belts, although a factor of uncertainty still remains. There is also evidence that accidents have been caused by drivers operating at relatively high speeds, and who suddenly became aware that their safety belts were not buckled, and, in an effort to fasten the belt while their vehicles were in motion became distracted and lost control.

Objects of the invention are to provide a system of the above general type, which increases the effectiveness of vehicle seat belts by reducing the possibility of a driver operating his vehicle while, primarily, his own safety belt is unfastened, and which makes it also possible to enforce fastening of the belts of passengers—which is especially suited for substitution of conventional safety belt installations—which can easily be connected to the electrical component of the driving motor for blocking the same and, if desired, for actuating a signal until a belt or belts are secured—which can be easily adapted to existing safety belt strap and buckle constructions—which can be applied to any number of seats of a given vehicle—which does not require more attention than standard safety belt systems—and which is inexpensive with respect to manufacture and installation and yet fully reliable and durable.

The nature and substance of the invention can be shortly stated as involving a flexible conductor leading from a metallic buckle member of a conventional safety belt unit along one of the flexible strap members to a terminal of an electric circuit necessary for the operation of the driving motor of the vehicle, in combination with a spring contact on the clamped member of the buckle and connected to a second flexible conductor leading along one or the other of the strap members to a second terminal of the above-mentioned circuit. The flexible conductor means can be attached to or incorporated in one of the strap members in which case their terminals, one being the above-mentioned spring contact, are both on the same, such as the clamped or plate member of the buckle. As an alternative each strap can carry a conductor in which case the spring contact is on one, such as the clamped, buckle member whereas the second conductor terminates at the other, such as the clamping member. In the first instance the clamping member makes, upon secure fastening of the belt, contact between the spring contact leading to one, and the terminal of the other flexible conductor, whereas in the other instance contact between the spring contact on one of the buckle members is made with the wire terminal on the other buckle member when the two members are secured together. In an important embodiment of the invention two or more safety belt units with their straps, buckles, and conductors are incorporated in the system in series thus necessitating closing of all or a selected number of buckles before the vehicles can be started.

In one type of embodiment the ends of the strap conductors are led to terminals constituting a gap in the starter circuit of the motor for connection across the gap of means for opening and closing an operation effecting circuit of the motor. In other embodiments a signal is actuated when the ignition key or button is operated and the motor cannot be started before the driver's belt or other belts in addition are secured, when the signal stops and the starter is unlocked.

These and other objects, advantages, and characteristically novel aspects of the invention will appear from the following description of several practical embodiments thereof.

The description refers to a drawing wherein

Figure 1:
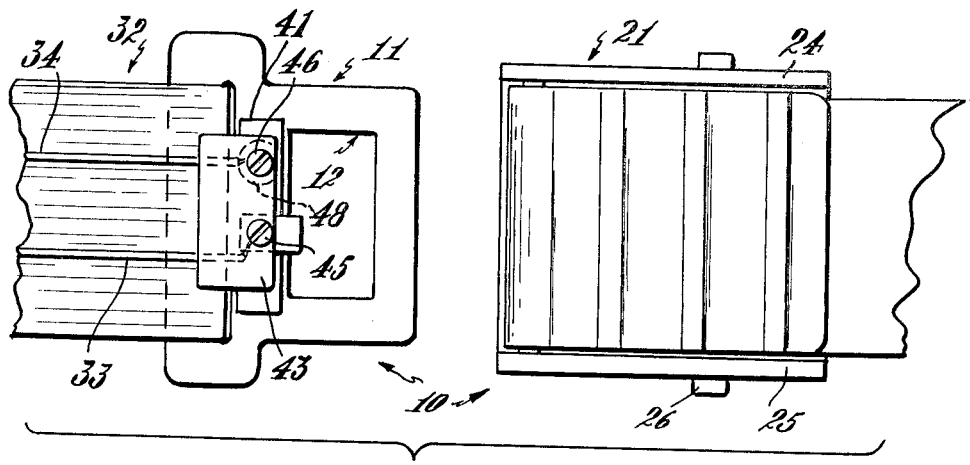
FIG. 1 shows the buckle of a safety belt unit in open position with the two flexible conductors incorporated in one of the belt straps.
Figure 2:
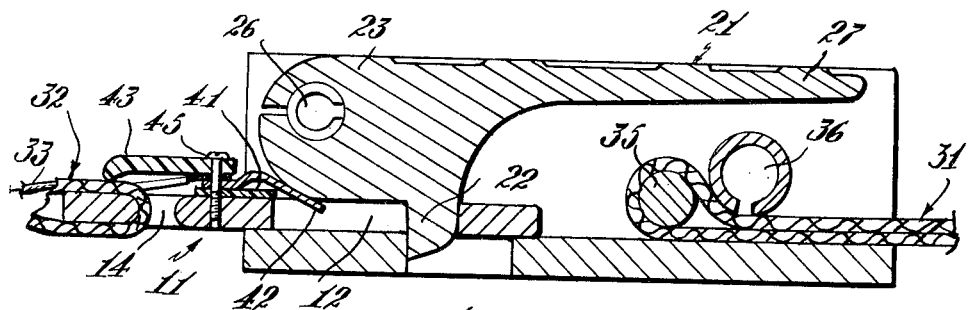
FIG. 2 is a longitudinal section through the belt buckle according to FIG. 1 but in closed position with the strap conductor contacts closed by the buckle members.

In FIGS. 1 and 2, 11 designates the clamped member or locking plate of a buckle 10, 21 being the clamping or latch member. The buckle shown by way of illustration is of conventional construction, the clamped member having an aperture or recess 12 which is in closed position engaged by a lug 22 (FIG. 2) of the latch bar 23 which is mounted between the flanges 24 and 25 by being pivoted on a pin 26. By lifting the finger tip lever 27, the lug 22 can be disengaged from the slot 12 of the plate member 11. A conventional strap 31 is attached to the latching buckle member 21 by means of snubbing bars 35 and 36.

A special belt strap 32 is attached in conventional manner to a slot 14 of the plate member 11. This special strap incorporates two wires 33 and 34 which can be woven or braided into the belt strap 32. They will ordinarily be insulated but they can also be incorporated bare by moulding into a contiguous belt strap made of suitable synthetic insulating material.

The clamped or locking plate member 11 carries a terminal plate 41 of insulating material, a contact leaf spring 42, and a terminal protecting plate 43 of insulating molded material, all of these being fastened to the locking plate 11 by insulating fastening means, such as nylon screw 45 and metal screw 46. The wire 33 is connected metal to metal with the contact spring 42, whereas the end of the wire 34 can be directly connected to the plate 11 without provisions of insulating it therefrom, a washer 48 distancing the plate 43 at its other side, and screw 46 pressing 34 towards 11.

Figures 3, 4, 5, 6:
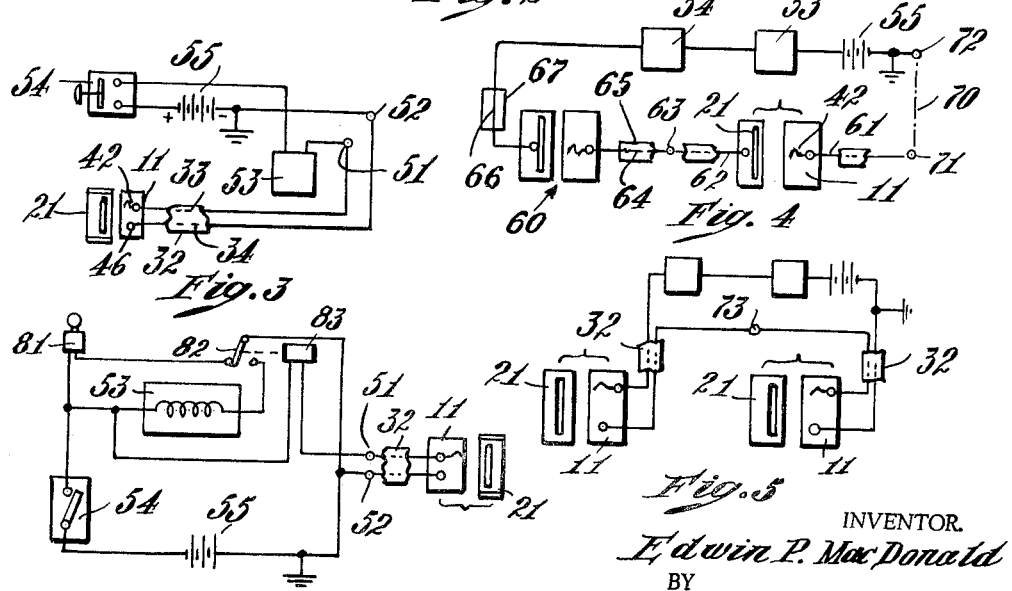
FIG. 3 is a schematical diagram of the system as a whole showing the incorporation of the safety circuit in the ignition system of a motor, this schematical figure showing the buckle contact embodiment according to FIG. 1.
FIG. 4 illustrates an embodiment where each belt strap has a single flexible conductor, and this figure also illustrates the possibility of having two safety belts units in series.
FIG. 5 illustrates a unit in series installation such as in FIG. 4, but with the buckle contacts arranged in accordance with FIGS. 1 to 3.
FIG. 6 illustrates a system, utilizing the buckle switch of FIGS. 1 and 2, which incorporates a warning signal arrangement.

The assembly of the above described safety belt system with the driving motor of the vehicle is illustrated in FIG. 3. In this figure, the plate 11, the spring contact 42, the metallic contact 46, the two flexible wires 33 and 34 and the belt strap 32 are schematically indicated in conformity with FIGS. 1 and 2. One wire such as 33 is connected to a gap terminal 51 of the starter circuit of the motor, and the other wire 34 is connected to a second gap terminal 52. The starter solenoid is indicated at 53, the starter contact such as a key switch or push button switch is indicated at 54, and the battery at 55.

The operation of the above described system is as follows.

With the safety belt buckle opened as shown in FIG. 3, the wires 33 and 34 are interrupted at contacts 42 and 46 so that the starter circuit is open at 51, 52. When the buckle is closed, the metallic buckle latch 23 closes this gap by securely pressing against the spring contact 42 and making overall metallic contact with the end terminal 46 of wire 34 which is not insulated from the plate member 11. The motor vehicle can then be started, but will not be stopped upon unbuckling of the safety belt, either accidentally or intentionally.

FIG. 4 shows an embodiment wherein each strap has a single wire which is often advantageous, necessitating only one type of belt to be stocked for purposes of this invention. The wire 61 of one strap is fastened to a spring contact 42 identical with that described with reference to FIGS. 1 and 2, applied to the clamped buckle plate member 11. The wire 62 of the other strap is with metallic contact fastened to the clamping latch member 21. As indicated at 60, a second belt system, connected in series to wires 62 and 61 can be installed for a second seat. In this case the wire 62 leads to a terminal 63 which is in turn connected to a third wire 64 within a belt strap 65. The fourth wire 66 is secured to the fourth belt strap 67 and leads, as described with reference to FIG. 3, to the ignition circuit gap as above described.

FIG. 5 illustrates another embodiment with buckles of the type described with reference to FIGS. 1, 2, 3, but showing two belt buckle systems in series. The numerals of FIG. 3 are applied to FIG. 5 so that this figure requires no further description. It will of course be understood that plain belt straps, without wires woven, braided or molded thereinto will be connected to the members 21 shown in FIGS. 3 and 5, the corresponding second belt straps being provided with two wires such as 33 and 34 described above with reference to FIGS. 1 and 2.

It will now be evident that more than two safety belt units can conveniently be added in series such as indicated by the dotted line 70 signifying a conductor in FIG. 4, the additional safety straps with their buckles being connected between terminals 71 and 72.

It will be understood that the starter circuitry gap 51, 52 can be very easily established, and the ends of the respective leads provided with conveniently accessible and secured terminal contact devices 51, 52. Similarly, the terminals for series connected of several safety belt units such as 63, 71, and 72 of FIG. 4 and 73 of FIG. 5 can be easily established on the body of the vehicle.

FIG. 6 illustrates a safety system according to the invention which incorporates a signaling arrangement. In this figure, 53 is again a starter unit, 54 a starter contact unit, 51, 52 terminals leading to the conductors, such as in strap 32, and 11, 21 are the buckle members. As clearly shown in FIG. 6, a signaling circuit includes a signaling device such as a bell 81, and a relay with contacts 82 and solenoid 83. When the starter contact 54 is closed, 81 is actuated while the starter coil is yet disconnected. Upon closing the belt contacts, 83 is energized, 82 disconnects the signal and connects the starter unit.

It should be understood that the present disclosure is for the purpose of illustration only and that this invention includes all modifications and equivalents which fall within the scope of the appended claims.

I claim:

1. Electrical safety device which permits the starting of a vehicle motor only upon previous securing of a safety belt unit having a buckle with a metallic clamping member at the end of a first strap member shaped to receive and releasably to hold a metallic clamped member at the end of a second strap member and having a recess for engagement of the clamping member, comprising:

two terminal means for connection to means for opening and closing an operation effecting circuit of said motor;

first flexible conductor means leading from one of said metallic buckle members along one of said strap members to the first one of said terminal means;

a spring contact mounted on said clamped member insulated therefrom, and including a portion extending into said recess for making contact with said clamping member upon interengagement of clamping and clamped members;

second flexible conductor means leading along said second strap member from said spring contact to the second one of said terminal means; and whereby interlocking of and hence metallic contact between the buckle members causes electric connection of said terminal means through both clamping and clamped members, permitting the starting of the motor.

2. Device according to claim 1 wherein said first conductor means leads along said first strap member from said clamping member to said first terminal means.

3. Device according to claim 1 wherein said first conductor member leads along said second strap member from said clamped member to said first terminal means.

4. Device according to claim 1 having a second safety belt unit and a second buckle with a second clamping member at the end of a third strap member and a second clamped member at the end of a fourth strap member, a flexible conductor means leading along each of said strap members, the device further comprising means for connecting in series the flexible conductor means of the strap members between the two buckles, and means for connecting the conductor means of the remaining two strap members to respective ones of said terminal means.

5. Device according to claim 1 having a second safety belt unit and a second buckle with a second clamping member at the end of a third strap member and a second clamped member at the end of a fourth strap member, two flexible conductor means leading along a selected strap member of each buckle, the device further comprising means for connecting one conductor of each selected strap member to one of said terminal means, respectively, and means for connecting in series the other conductors of the respective strap members.

6. Electrical safety device which permits the starting of a vehicle motor only on previous securing of a safety belt unit having a buckle with a metallic clamping member at the end of a first strap member shaped to receive and releasably to hold a metallic clamped member at the end of a second strap member and having a recess for engagement of the clamping member, comprising:

two terminal means for connection to means for opening and closing an operation effecting circuit of said motor;

first flexible conductor means leading from said clamped member along said second strap member to the first one of said terminal means;

a spring contact mounted on said clamped member insulated therefrom, and including a portion extending into said recess for making contact with said clamping member upon interengagement of clamping and clamped members;

second flexible conductor means leading along said second strap member from said spring contact to the second one of said terminal means; and whereby interlocking of and hence metallic contact between the buckle members causes electric connection of said terminal means through both clamping and clamped members permitting the starting of the motor.

(References on following page)

References Cited by the Examiner

UNITED STATES PATENTS

| | | | |
|---|---|---|---|
| 2,510,115 | 6/1950 | Jakosky | 180—82 X |
| 2,777,531 | 1/1957 | Erickson | 180—82 |
| 2,802,073 | 8/1957 | Simon | 180—82 X |
| 2,807,729 | 9/1957 | Redick | 123—179 |
| 2,824,293 | 2/1958 | Meinhardt | 180—82 X |
| 2,868,309 | 1/1959 | Burgess | 180—82 |
| 2,880,789 | 4/1959 | Leibinger | 180—82 |
| 2,996,587 | 8/1961 | McCarthy | 340—278 |
| 3,074,055 | 1/1963 | Rudolph et al. | 340—52 |
| 3,112,467 | 11/1963 | Benning | 340—52 |

FOREIGN PATENTS

| | | |
|---|---|---|
| 174,443 | 2/1961 | Sweden. |

BENJAMIN HERSH, *Primary Examiner.*

KENNETH H. BETTS, MILTON BUCHLER,
*Examiners.*